May 7, 1929. W. C. BLEHER ET AL 1,711,557
MANDREL CONVEYING MEANS
Filed July 12, 1927   4 Sheets-Sheet 4
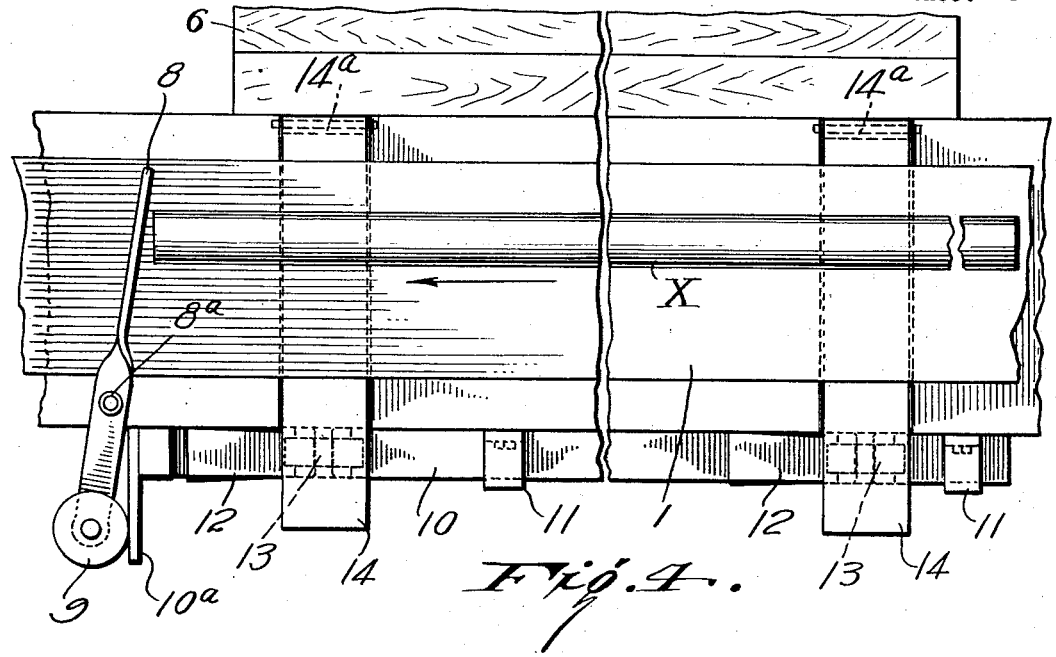
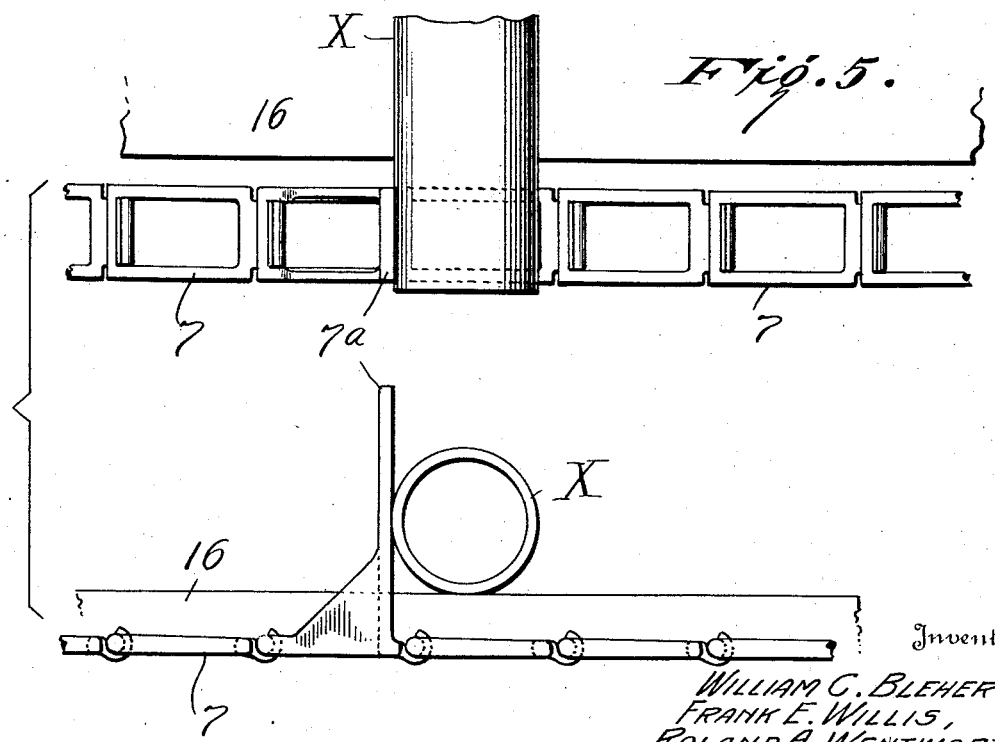
Inventors
WILLIAM C. BLEHER,
FRANK E. WILLIS,
ROLAND A. WENTWORTH,
By
Attorneys Patented May 7, 1929.

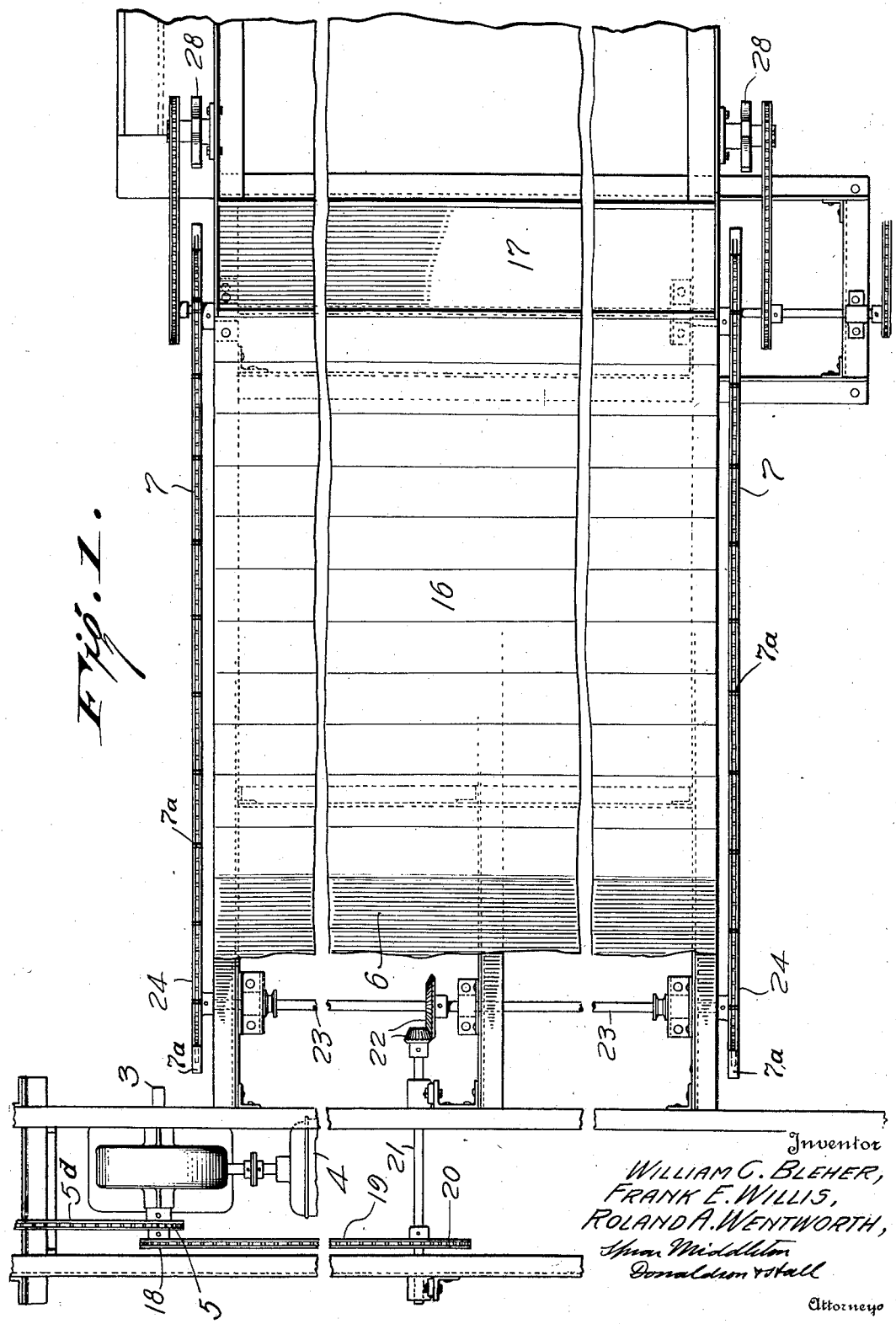

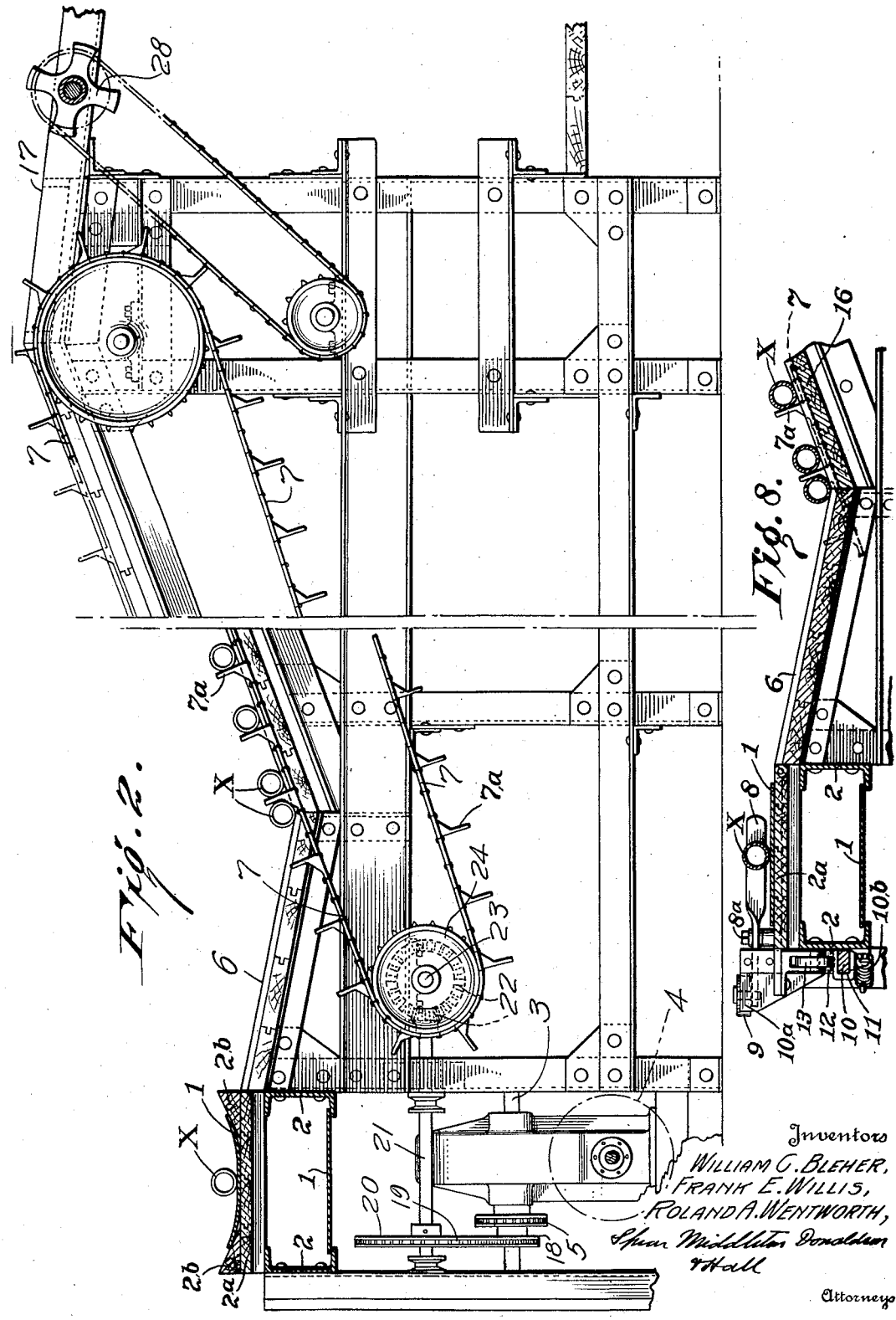

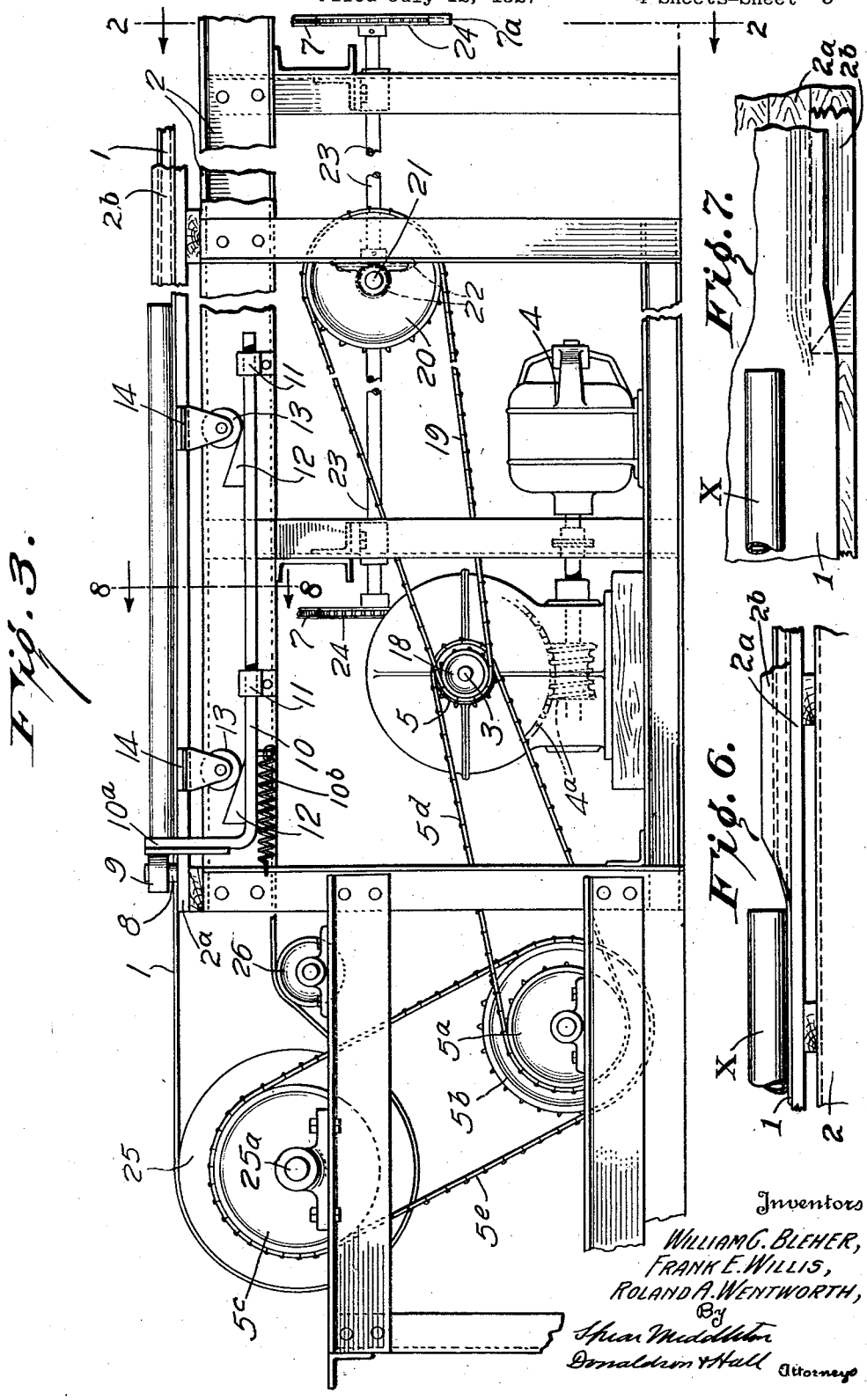

1,711,557

UNITED STATES PATENT OFFICE.

WILLIAM C. BLEHER, FRANK E. WILLIS, AND ROLAND A. WENTWORTH, OF WATERTOWN, MASSACHUSETTS, ASSIGNORS TO HOOD RUBBER COMPANY, OF WATERTOWN, MASSACHUSETTS, A CORPORATION OF MASSACHUSETTS.

MANDREL-CONVEYING MEANS.

Application filed July 12, 1927. Serial No. 205,110.

Our present invention relates to apparatus for conveying mandrels or poles bearing uncured inner tubes from a suitable source, such as the station or stations where the rubber sheets are wrapped on the mandrels to a device or apparatus for supplying them to means by which they are provided covered with helically wound fabric strips prior to being introduced into the vulcanizers such as disclosed in a companion application filed in the U. S. Patent Office on the 26th day of March 1927, Serial Number 194,330.

The invention aims to provide apparatus by which the mandrels carrying the tubes may be expeditiously and continuously conveyed from a relatively remote station or stations to a position in proximity to the lathe mechanism, and automatically delivered from the conveyor to the wrapping mechanism.

With these and other objects in view which will be readily apparent from the following specification, the invention includes the novel features of construction and arrangement and combination of parts hereinafter described and defined by the appended claims.

What we at present consider the preferred embodiment of the invention is illustrated in the accompanying drawings in which:—

Figure 1 is a plan view partly broken away.

Fig. 2 is a section substantially on line 2—2 of Figure 3, partly broken away and with parts omitted.

Fig. 3 is an end elevation partly broken away.

Figs. 4 and 5 are enlarged detail views.

Figs. 6 and 7 are fragmentary detail views.

Fig. 8 is a section on line 8—8 of Fig. 3.

Referring by reference characters to these drawings, the numeral 1 designates a conveyor belt supported in troughed shape by troughing strips $2^b$ carried by supporting table $2^a$ supported by the longitudinally bars 2 and extending for a suitable distance to be adjacent one or more operator's stations (not shown) where the uncured tube sheets are rolled on the mandrels or poles. Conveyor belt 1 passes over suitable pulleys, that (25) at the end shown in Fig. 3 being driven from shaft 3 (operated by any suitable prime mover such as motor 4 and enclosed worm gearing $4^a$) through suitable drive means such as sprockets 5, $5^a$, $5^b$ and $5^c$ and sprocket chains $5^d$, $5^e$. Sprocket $5^c$ is fast on the shaft $25^a$ which carries and drives the belt supporting and driving pulley 55, a snub roll 26 being located adjacent said drive pulley to deflect the lower or idle run of the belt and thereby secure a more efficient driving contact and also elevate said lower run. Adjacent the delivery end of the belt the troughing members are discontinued as shown in Figs. 6 to 8 and at one side of the flat table portion thereby provided is an inclined gravity table 6, Figs. 1 and 2, to which the tube carrying mandrels are automatically delivered from the belt and down which they roll by gravity until they are picked up by the elevating conveyor 7, hereinafter described.

For the purpose of automatically delivering the mandrels from the belt to the gravity table, I provide a lever 8 fulcrumed at $8^a$ on the conveyor frame and projecting horizontally across the upper face of the belt in the path of the mandrels carried thereby as shown in Fig. 4. The opposite end of the lever carries a roller 9 bearing on a contact member $10^a$ mounted on the upturned end of a bar 10 slidably carried by the brackets 11 on the conveyor frame. Bar 10 carries cams or inclines 12 (Fig. 3) which cooperate with rollers 13 carried by the free ends of pivoted arms 14 underlying the belt 1 and fulcrumed at $14^a$ to the conveyor frame.

The movement of the mandrel X by the conveyor belt in the direction indicated by the arrow, Fig. 4, causes the end of the mandrel to strike the lever 8, swinging the latter about its fulcrum and causing roller 9 to move bar 10 in the opposite direction against the tension of spring $10^b$. The inclines or cams 12 carried by bar 10 are thereby moved beneath the rollers 13, lifting the latter and the free ends of the arms 14. Thereby the arms 10 and belt 1 overlying the same are tilted into an inclined position and the mandrel rolls by gravity off the conveyor belt and down the inclined table 6 to the bottom edge of the latter, where it is picked up by the elevating conveyor.

The elevating conveyor comprises a pair of endless chains 7 located at opposite sides of an inclined table 16 and having certain of its links provided with upstanding abutments 7ᵃ (Fig. 5) adapted to impinge against the uncovered ends of the poles or mandrels, the movement of the conveyor chains thus causing the mandrels to be rolled up the inclined table 16 to reversely inclined supports 17. Conveyor chains 7 may be conveniently driven through chain and sprocket gearing 18, 19 and 20, sprocket 18 being fast on shaft 3 and the sprocket 20 being fast on shaft 21, which, through bevel bearing 22 drives shaft 23 which in turn carries the sprockets 24 around which the elevator sprocket chains 7 pass.

The reversely inclined supports 17 above referred to are preferably in the shape of angle bars having the upper edges of their vertical webs positioned to receive the uncovered ends of the mandrels and said supports carry an intermittently rotated separator 28 by which the mandrels are held back on the support and fed one at a time to the mandrel positioning and rotating mechanism disclosed in the companion application hereinbefore referred to.

Having thus described our invention, what we claim is:

1. In combination an endless flexible belt conveyor for conveying tube mandrels and the like, receiving means at the side of the conveyor adjacent the delivery end, and means operated by the impact of the article carried by the belt for causing the article carrying portion of the belt to be tilted into an inclined plane to deliver the article to said receiving means.

2. In combination an endless flexible belt conveyor with means for driving it, receiving means at the side of the conveyor adjacent one end, a member projecting across the upper face of the conveyor in the path of the articles carried thereby and adapted to be moved longitudinally of the conveyor by the articles thereon, means underlying the belt for tipping the portion adjacent the receiving means, and means whereby movement of said overlying member operates said tilting means.

3. In combination an endless conveyor belt with means for driving it, receiving means at one side thereof adjacent the delivery end, lever means underlying the belt adjacent the receiving means and fulcrumed at the side of the belt adjacent said receiving means, cam means for raising the remote ends of the lever means, and a member overlying the belt and lying in the path of movement of objects carried thereby and movable longitudinally of the belt, and means whereby the movement of said overlying member operates said cam means.

4. In combination an endless conveyor belt with means for driving it, receiving means at one side thereof adjacent the delivery end, a plurality of arms extending transversely beneath the belt and fulcrumed on fixed pivots on the side adjacent the receiving means, a longitudinally slidable bar having inclines beneath the free ends of said arms, a member overlying the belt and movable longitudinally of the belt by articles carried thereby, and means whereby movement of said overlying member operates said bar.

5. In combination an endless conveyor belt with means for driving it, receiving means at one side thereof adjacent the delivery end, a plurality of arms extending transversely beneath the belt and fulcrumed on fixed pivots on the side adjacent the receiving means, a longitudinally slidable bar having inclines beneath the free ends of said arms, a lever of the first order fulcrumed on a fixed pivot and having one arm or portion overlying the belt, and a contact member carried by said bar with which the other end of the lever cooperates.

6. Apparatus according to claim 1 in which the receiving means comprises a downwardly inclined table which communicates with an upwardly inclined delivery conveyor terminating in an inclined storage support provided with intermittently operated mandrel retaining and releasing means.

In testimony whereof, we affix our signatures.

WILLIAM C. BLEHER.
FRANK E. WILLIS.
ROLAND A. WENTWORTH.